(12) United States Patent
Aoyama et al.

(10) Patent No.: US 7,906,721 B2
(45) Date of Patent: Mar. 15, 2011

(54) SOLAR CELL MODULE CONNECTOR

(75) Inventors: Masahiro Aoyama, Osaka (JP);
Katsunobu Matsuyoshi, Suita (JP);
Koichi Saito, Osaka (JP); Kazunori Inami, Osaka (JP)

(73) Assignees: Sansha Electric Manufacturing Company, Limited, Osaka-shi, Osaka-fu (JP); Unicorn Electronics Company, Ltd., Suita-shi, Osaka-fu (JP)

( * ) Notice: Subject to any disclaimer, the term of this patent is extended or adjusted under 35 U.S.C. 154(b) by 901 days.

(21) Appl. No.: 11/791,500

(22) PCT Filed: Nov. 25, 2005

(86) PCT No.: PCT/JP2005/021692
§ 371 (c)(1),
(2), (4) Date: Jul. 10, 2007

(87) PCT Pub. No.: WO2006/057342
PCT Pub. Date: Jun. 1, 2006

(65) Prior Publication Data
US 2008/0011348 A1      Jan. 17, 2008

(30) Foreign Application Priority Data
Nov. 25, 2004   (JP) .................................. 2004-340785

(51) Int. Cl.
*H01N 31/042*      (2006.01)
(52) U.S. Cl. .......... 136/244; 257/456; 439/52; 439/76.2

(58) Field of Classification Search ................. 136/244; 257/465; 439/56–76.2
See application file for complete search history.

(56) References Cited

FOREIGN PATENT DOCUMENTS

| JP | 08-116628 A | 5/1996 |
|---|---|---|
| JP | 11-251614 | 9/1999 |
| JP | 11-251614 A | 9/1999 |
| JP | 2003-026777 | 1/2003 |
| JP | 2003-26777 A | 1/2003 |
| JP | 2004-282107 A | 10/2004 |
| JP | 2005-057008 | 3/2005 |
| JP | 2006-073978 | 3/2006 |

OTHER PUBLICATIONS

International Search Report from application PCT/JP2005/021692. Not prior art.
Written Opinion from application PCT/JP2005/021692. Not prior art.
International Preliminary Report on Patentability from application PCT/JP2005/021692. Not prior art.
Office Action Issued on Oct. 10, 2008 in corresponding Chinese Patent Application No. 200580044202.5 (PCT Application in National Phase).

*Primary Examiner* — Alexa D Neckel
*Assistant Examiner* — Xiuyu Tai
(74) *Attorney, Agent, or Firm* — Duane Morris LLP

(57) ABSTRACT

To provide a thin solar cell module connector having improved reliability, enduring long use, and having high productivity.
A diode chip 6 is disposed in a diode module 2. The diode module 2 is transfer-molded. The diode module 2 is fitted in an opening 22 in the module box 20.

5 Claims, 4 Drawing Sheets

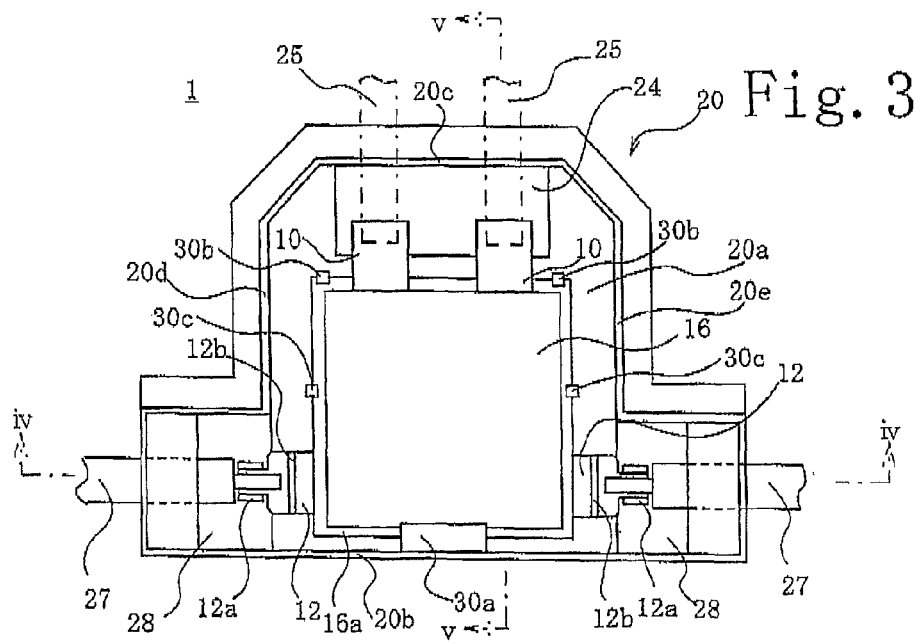
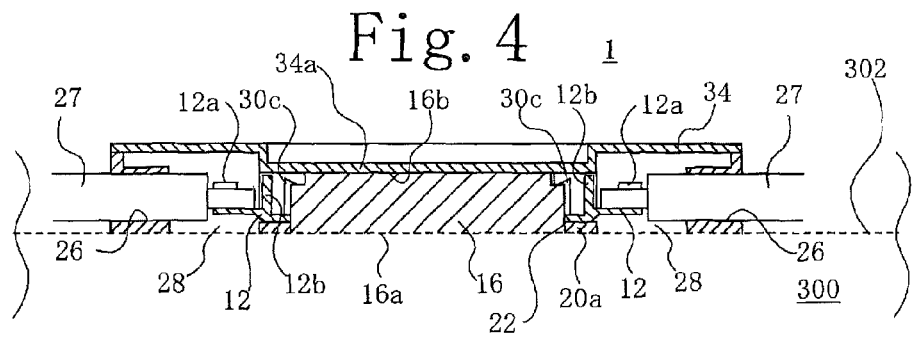
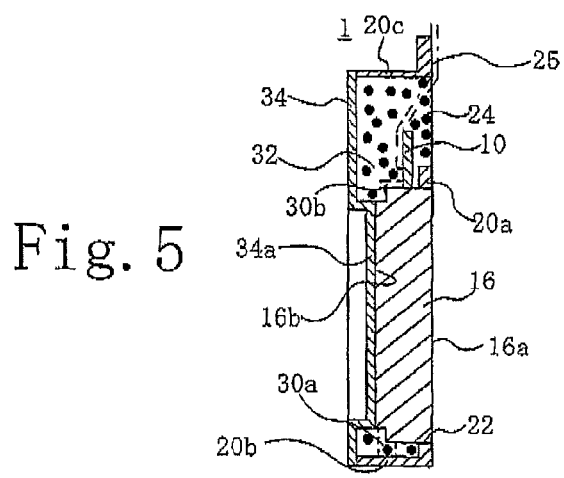

SOLAR CELL MODULE CONNECTOR

TECHNICAL FIELD

This invention relates to a solar cell module connector and, more particularly, to such solar cell connector having a diode for bypassing a solar cell module.

BACKGROUND

Connectors are used for connecting a plurality of solar cell modules in series at a site where such solar cell modules are installed. Some types of such connectors have a built-in bypass diode for bypassing a solar cell module. Technical attempts to improve the connectors have been made to make them small in thickness. For example, Japanese Patent No. 3,498,945 discloses in its specification a technique, according to which a bare chip diode, which is not provided with a protective package and, therefore, bare, is used, and, when a box of a solar cell module connector is filled with resin, the bare chip diode is also packaged together. According to this technique, however, when a solar cell module with which a connector is connected in parallel is not generating electric power, current from other solar cell modules connected in series with that inoperative solar cell module flows through the diode of the connector connected in parallel with that inoperative solar cell module. In such case, the diode generates heat, but the generated heat cannot be dissipated sufficiently. A technique trying to improve this drawback is disclosed in Patent Literature 1.

According to the technique disclosed in Patent Literature 1, the interior of a box made of an insulating material is divided into three zones juxtaposed in parallel with each other. The one of the three zones at one end of the juxtaposition is a terminal zone for solar cell module leads, the center one is a diode heat dissipating plate zone, and the other end zone is a terminal zone for input/output cables. An opening is formed in the bottom wall of the diode heat dissipating plate zone, and four rectangular heat dissipating plates are disposed in line in the opening. Diodes are mounted on the successive three heat dissipating plates from one end of the line. Each diode includes a diode semiconductor chip embedded in an insulating mold. The anode of the semiconductor chip is connected to an external conductor exposed on the bottom of the mold, and the cathode is led out of the mold by means of a lead. The external conductors of the three diodes are attached on the above-stated three heat dissipating plates, respectively, with the cathodes connected to the respective adjacent heat dissipating plates, resulting in series connection of the three diodes. Terminals for the module leads are disposed with their one ends located at the edge portions of the respective heat dissipating plates on the solar cell module lead terminal zone side thereof, and with the other ends located within the solar cell module lead terminal zone. Also, terminals for the input/output cables are disposed, with their one ends located at the edge portions on the input/output cable terminal zone side of the heat dissipating plates at the opposite ends of the line, and with the other ends located within the input/output cable terminal zone. In this state, the diode heat dissipating plate zone is filled with an insulating resin so that the respective diodes are embedded in it. After being filled, the box is fixed to the rear side of a solar cell panel, with the heat dissipating plates exposed on the bottom wall side of the box contacting the solar cell panel via a heat conductive, electrically insulating sheet, A solar cell module is connected to each solar cell module lead terminal by the associated solar cell module lead, which results in parallel connection of each diode with one of the solar cell modules. The input/output cables are connected to the input/output cable terminals so that current can be supplied to or derived from the respective solar cell modules. The solar cell module leads are soldered to the solar cell module lead terminals, and the input/output cables are also soldered to the input/output terminals. After that, an insulating resin is placed in the solar cell module lead terminal zone so that the solar cell module leads and the solar cell module lead terminals are embedded in the resin, and an insulating resin is placed in the input/output cable terminal zone so that the input/output cables and the input/output cable terminals are embedded in the resin.

| [Patent Literature 1] | JP 2005-209971 A |
|---|---|

DISCLOSURE OF THE INVENTION

Problem to be Solved by the Invention

With the connector disclosed in Patent Literature 1, when one solar cell module is not generating electricity, current from another solar cell module flows through the diode connected in parallel with the solar cell module generating no electricity. According to the technique of Patent Literature 1, the heat generated is dissipated from the heat dissipating plate into the solar cell panel via the heat conductive insulating sheet. In order to meet IEC61215, a standard for solar cell modules of International Electrotechnical Commission (IEC) issued in April 2005, the heat dissipating plates must be large, resulting in increase of the size of the box. This results in increase of the size of the connector itself. Furthermore, the heat dissipating plate zone of the box must be filled with insulating resin, which causes decrease of the productivity of the connectors when they are mass-produced. When the solar cell panel is installed on a roof, the temperature of the solar cell modules rises, causing rising of the temperature of the diodes in the connectors connected to the solar cell modules. Repetition of temperature increase could cause mechanical distortion of the diodes and change of electrical characteristics of the diodes.

An object of the present invention is to provide thin solar cell module connectors, which have improved reliability, are enduring for long term use, and have high productivity.

Means to Solve the Problem

A solar cell module connector according to one embodiment of the present invention includes a diode module and a module box. The diode module has a diode chip disposed therein. The diode module may have one diode chip or a plurality of diode chips connected in series. The diode module is so arranged that the diode chip can be connected to a solar cell module and also that current from the solar cell module can be taken out. It is so arranged that, when a series combination of plural diode modules is used, the two ends of each diode chip can be connected to an associated solar cell module. The module box is made of insulating material, and the diode module is placed in the module box. A lead lead-in section is formed in the module box for leading, into the module box, leads for connecting the diode chip to the solar cell module and leads for deriving current from the diode chip.

It is desirable to transfer-mold the diode module from the viewpoint of productivity and thermal conductivity.

It is desirable for the module box to have a surface adapted to contact the solar cell module, and have an opening formed in that surface. The diode module is fitted into the opening. The surface of the diode module located within the opening may desirably be flat and smooth. Also, it is desirable that the surface of the diode module located within the opening and the surface of the module box with the opening formed therein be coplanar with each other.

Further, the module box may desirably have a cover, and, from the viewpoint of safety and heat dissipation, the cover may desirably have a portion which is in surface-contact with the diode module.

BRIEF DESCRIPTION OF THE DRAWINGS

FIG. 3 is a front view of the connector according to the first embodiment of the present invention.

FIG. 4 is a cross-sectional view along a line IV-IV in FIG. 3.

FIG. 5 is a cross-sectional view along a line V-V in FIG. 3.

BEST MODE FOR CARRYING OUT THE INVENTION

Figure 1:
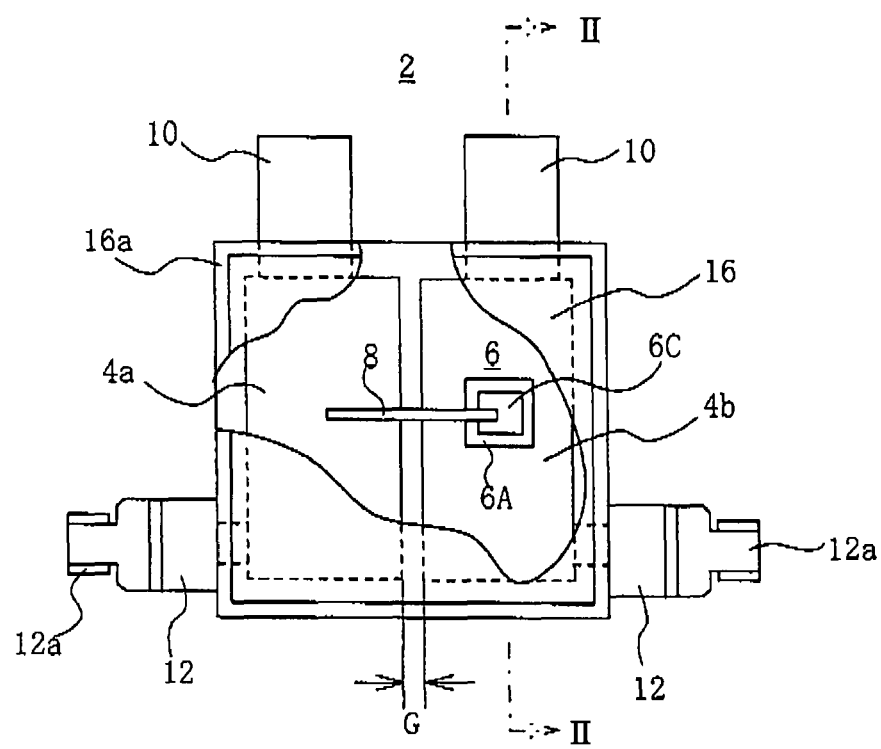
FIG. 1 is a front view of a diode module used in a connector according to a first embodiment of the present invention.

A solar cell module connector 1 according to a first embodiment of the present invention includes a diode module 2 like the one shown in FIG. 1. The diode module 2 has plural, e.g. two, heat dissipating plates 4a and 4b. The heat dissipating plates 4a and 4b are rectangular metal plates having a thickness of 1 mm or more, and are spaced from each other with their longer side disposed in parallel, with a spatial insulation gap G disposed between them. A bypass diode, e.g. a thin plate diode chip 6, has its anode 6A soldered to the surface of the heat dissipating plate 4b. The diode chip 6 has its cathode 6C connected to the surface of the heat dissipating plate 4a via a connecting conductor 8. Slits may be desirably formed to surround the four corners of the anode of the diode chip 6. The slits are useful in positioning the diode chip 6 in place and in dispersing thermal stress caused by heat generated by the diode chip 6.

Terminals 10 for connection to solar cell module leads are formed to extend from one of shorter sides of each of the heat dissipating plates 4a and 4b. The terminals 10 extend outward generally perpendicularly to the shorter sides of the heat dissipating plate 4a and 4b and are adapted to be connected to the leads of the solar cell module.

From the outer ones of the longer sides of the heat dissipating plates 4a and 4b, terminals 12, 12 for connection to solar cell input/output cables extend outward generally perpendicularly to the longer sides. Cable attaching portions 12a are formed at the distal ends of the respective terminals 12. Ridges 12b are formed to extend perpendicularly from intermediate locations on the terminals 12. The ridges 12b extend from one to the other side edges of the terminals 12.

Figure 2:
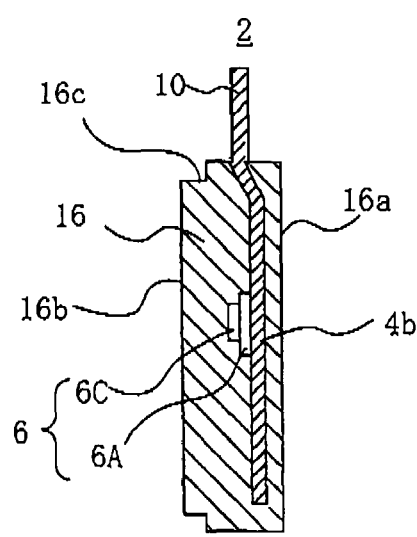
FIG. 2 is a cross-sectional view along a line II-II in FIG. 1.

The heat dissipating plates 4a and 4b, the diode chip 6 and the connecting conductor 8 are placed in a mold 16, and the terminals 10, 10 and 12, 12 are out of the mold 16. The mold 16 is formed by transfer-molding an insulating mold material, e.g. a synthetic resin such as an epoxy resin. It is desirable that an additive having high heat conductivity be added to the insulating mold material. Since the diode chip 6 is molded, it exhibits good moisture-resistance and impact-resistance. Furthermore, transfer-molding increases productivity. The mold 16 has a generally rectangular parallelepiped shape, and the heat dissipating plates 4a and 4b are located near a bottom wall 16a of the mold 16, as shown in FIGS. 1 and 2. The bottom wall 16a is formed smooth and flat. A step 16c is formed to extend along the periphery of an upper surface 16b opposing the bottom wall 16a of the mold 16.

The diode module 2 is housed in a module box 20 as shown in FIG. 3. The module box 20 has a bottom wall 20a, around which side walls 20b, 20c, 20d and 20e are disposed. The edges of the side walls 20b, 20c, 20d and 20e opposite to the bottom wall 20a define an opening. The module box 20 is formed of, for example, synthetic resin. It is desirable that the synthetic resin have good water-resistance and good thermal conductivity, and modified polyphenylene, for example, is preferred. The bottom wall 20a desirably has a small thickness in order to have improved heat dissipating property. The module box 20 has its side walls 20b and 20c disposed in parallel with each other. The diode module 2 is disposed in the module box 20 with the terminals 10, 10 located nearer to the side wall 20c and with the respective ones of the terminals 12, 12 located nearer to the side walls 20d, 20e.

A rectangular opening 22 is formed in the bottom wall 20a of the module box 20 at a location corresponding to the location where the diode module 2 is disposed, and the diode module 2 is fitted into the opening 22. As shown in FIGS. 4 and 5, the outer surface of the bottom wall 16a of the mold 16 of the diode module 2 fitted in place and the outer surface of the bottom wall 20a of the module box 20 are coplanar with each other.

Since the diode module 2 transfer-molded beforehand is disposed within the module box 20, this structure has higher productivity and more suitable to mass-production than a structure in which a diode chip mounted on a heat dissipating plate is disposed in each module box with an insulating material placed in each of such module boxes to embed the heat dissipating plate and the diode chip.

A lead lead-in section, e.g. a rectangular opening 24, is formed in the bottom wall 20a at a location corresponding to the location of the terminals 10. As shown in FIG. 5, solar cell module leads 25, 25 comprised of, for example, a flat, rectangular wire, are led into the module box 20 via the opening 24, and are soldered to the terminals 10, 10. The opening 24 can be formed in a side wall other than the bottom wall 20a, but it is desirable to form it in the bottom wall 20a in order to facilitate waterproofing the connector 1 is when it is attached to the solar cell module, as is described later.

Lead insertion sections, e.g. solar cell input/output cable insertion holes 26, 26 are formed in the side walls 20d and 20e at locations corresponding to those of the terminals 12, 12. The tip ends of the solar cell input/output cables 27, 27 inserted into the insertion holes 26, 26 are soldered 20 to the cable attaching portions 12a, 12a of the terminals 12. Also, openings 28, 28 are formed in the bottom wall 20a in the vicinity of the side walls 20d, 20e.

Module position defining members, e.g. claws 30a, 30b, 30b, 30c and 30c, are formed along the periphery of the opening 22 in the bottom wall 20a. These claws 30a, 30b, 30b, 30c and 30c are made of the same synthetic resin as the module box and have resiliency. The claw 30a is in engagement with the step 16c in the mold 16 at a location closer to the side wall 20b, as shown in FIG. 5, and presses the diode module 2 in the direction of the opening 24, while flexing due to the weight of the diode module 2, to thereby prevent the diode module 2 from moving in the direction opposite to the bottom wall 20a. The claws 30b, 30b engage with, the step 16c of the mold 16 at locations closer to the opening 24 to prevent the diode module 2 from moving in the direction toward the side walls 20b and 20c. The claws 30c, 30c engage with the step 16c of the mold 16 at locations closer to the respective side walls 20d and 20e to prevent the diode module 2 from moving toward the side walls 20d and 20e.

As shown in FIG. 5, the module box 20 is filled with an insulating filler 32 to thereby embed the terminals 10, the solar cell module leads 25, 25, the terminals 12, and the solar cell input/output cables 27, 27 therein, without covering the upper surface 16b of the mold 16. The insulating filler 32 is not shown in FIGS. 3 and 4 for simplicity of illustration. Because the terminals 10 and the solar cell module leads 25 are embedded in the insulating filter 32, they are waterproofed and are prevented from moving within the module box 20.

The opening located opposite to the bottom wall 20a of the module box 20 is closed by a cover 34 of an insulating material, e.g. an insulating material exhibiting good thermal conductivity. The cover 34 has a contacting portion 34a in surface contact with the upper surface 16b of the mold 16 of the diode module 2. The contacting portion 34a is preferably in surface contact with the entire upper surface of the mold 16 as shown in FIGS. 4 and 5. With the contacting portion 34a being in surface contact as described, no air layer is formed between the cover 34 and the mold 16, so that heat from the diode module 2 can be dissipated via the cover 34. In order to save the amount of the material for the cover 34 and secure good heat dissipation, it is desirable that the cover 34 be recessed in the portion corresponding to the upper surface of the mold 16 as shown in FIGS. 4 and 5. In order to avoid complexity, the cover 34 is not shown in FIG. 3.

The connector 1 is carried to a site where a solar cell module 300 is installed, with the diode module 2 fitted into the opening 22 in the module box 20, and with the solar cell input/output cables 27, 27 connected to the terminals 12, 12. At the installation site, the solar cell module leads 25, 25 of the solar cell module are inserted into the module box 20 through the opening 24, and soldered to the terminals 10, 10. An adhesive is applied over the portion of the solar cell module where the connector 1 is to be mounted, and the bottom wall 20a of the module box 20 and the bottom wall 16a of the mold 16 are pressed against the adhesive. In this state, since the outer surface of the bottom wall 20a of the module box 20 and the outer surface 16a of the mold 16 are coplanar with each other and in contact with the solar cell module 300 at surface 302 thereof (shown in dashed form), and since the bottom wall 16a of the mold 16 is flat and smooth, the bottom wall 16a of the mold 16 is in intimate contact with the solar cell module. After that the insulating filler 32 is placed, and the cover 34 is mounted to the opening of the module box 20 so that the contacting portion 34a can contact the upper surface 16a of the mold 16.

With the connector 1 used in this manner, when heat is generated in the diode chip 6, the heat is conducted from the heat dissipating plates 4a and 4b via the mold 16 to the solar cell module. Since the mold 16, which is transfer-molded as previously described, is in intimate contact with the solar cell module, the heat from the diode chip 6 can be dissipated well. Also, since the contacting portion 34a of the cover 34 is in contact with the upper surface of the mold 16, the heat is dissipated through the cover 34, too. Thus, without need for using a large-sized box as the module box 20, heat dissipation can be achieved well.

Figure 6:
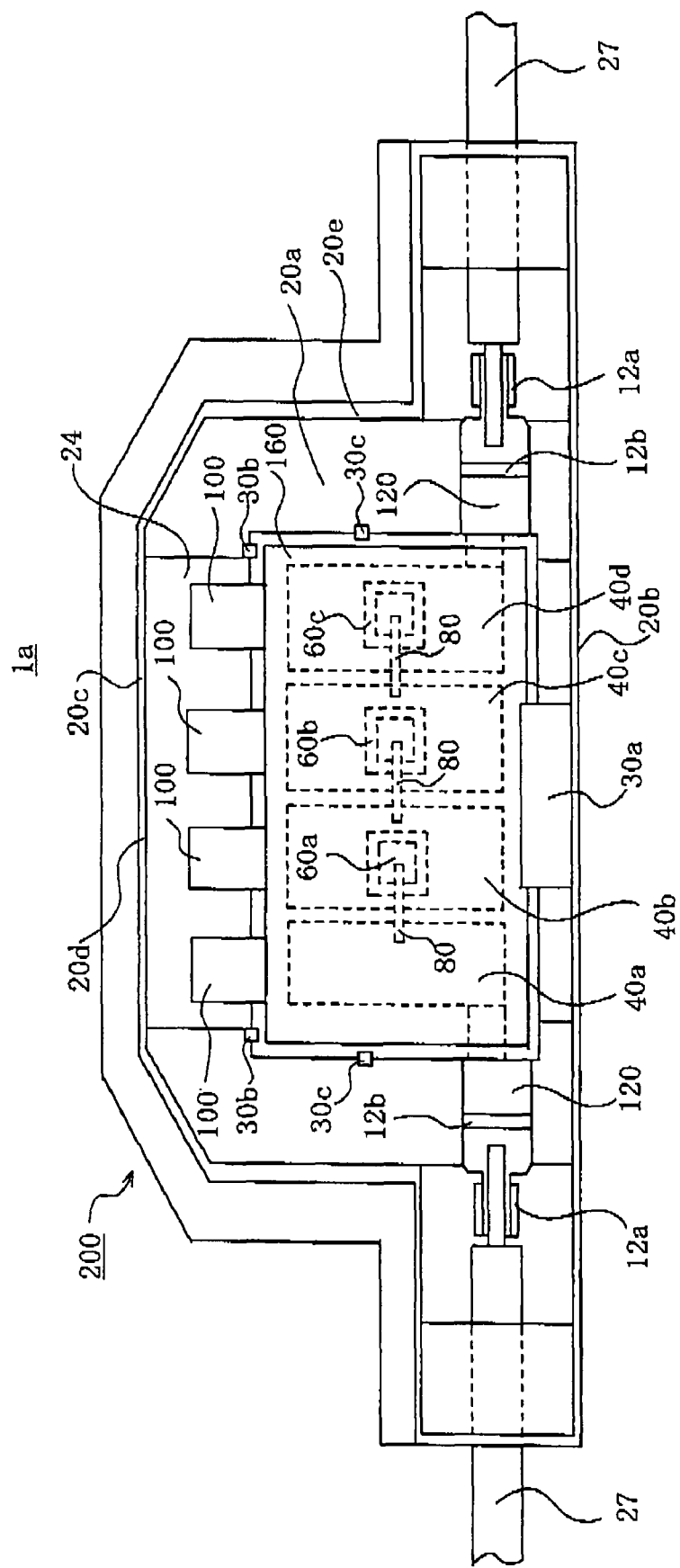
FIG. 6 is a front view of a connector according to a second embodiment of the present invention.

A connector 1a according to a second embodiment of the invention is shown in FIG. 6. The connector 1a employs plural, e.g. four, heat dissipating plates 40a, 40b, 40c and 40d. The anodes of diode chips 60a, 60b and 60c are connected to the heat dissipating plates 40b, 40c and 40d, respectively. The cathodes of the diode chips 60a, 60b and 60c are connected to the adjacent heat dissipating plates 40a, 40b and 40c, respectively, by respective connecting conductors 80. A terminal 100 is formed integral with each of the heat dissipating plates 40a, 40b, 40c and 40d, and terminals 120, 120 are formed on the oppositely disposed outermost heat dissipating plates 40a and 40d, respectively. The terminals 100 are the same as the terminals 10 of the first embodiment, and the terminals 120 are also the same as the terminals 12 of the first embodiment. As in the first embodiment, the heat dissipating plates 40a, 40b, 40c and 40d are molded in a mold 160. A module box 200 in which the mold 160 is placed has the same structure as the module box 20 of the first embodiment. The same reference numerals as used for the first embodiment are used for equivalent portions, and no detailed description about them is given.

Adjacent two of the terminals 100 of the connector 1a according to the second embodiment are adapted to be connected to the respective ends of each of three serially connected solar cell modules (not shown), whereby each of the three solar cell modules is connected in parallel with an individual one of the diode chips 60a-60c. The heat dissipating plates 40a-40d of the connector 1a are formed to have the same size, but no diode chip is disposed on the heat dissipating plate 40a, and, therefore, the amounts of heat dissipated through the heat dissipating plates 40a-40d are not equal. Accordingly, it is desirable to form the heat dissipating plates in such a manner that the heat dissipating plate with a diode mounted thereon, which can dissipate least heat into the surroundings and, therefore, would become hot if no measures are taken against it, has the largest width, the heat dissipating plates with a diode mounted thereon which can dissipate more heat into the surroundings have successively smaller widths, and the heat dissipating plate with no diode mounted thereon, which can dissipate heat easily, has the smallest width, whereby the respective heat dissipating plates can have the highest temperature lower than a prescribed temperature and still have smaller dimensions. In other words, the widths of the heat dissipating plates 40a-40d are desirably different from each other such that the width of the heat dissipating plate 40c≧the width of the heat dissipating plate 40d≧the width of the heat dissipating plate 40b≧the width of the heat dissipating plate 40a.

Figure 7:
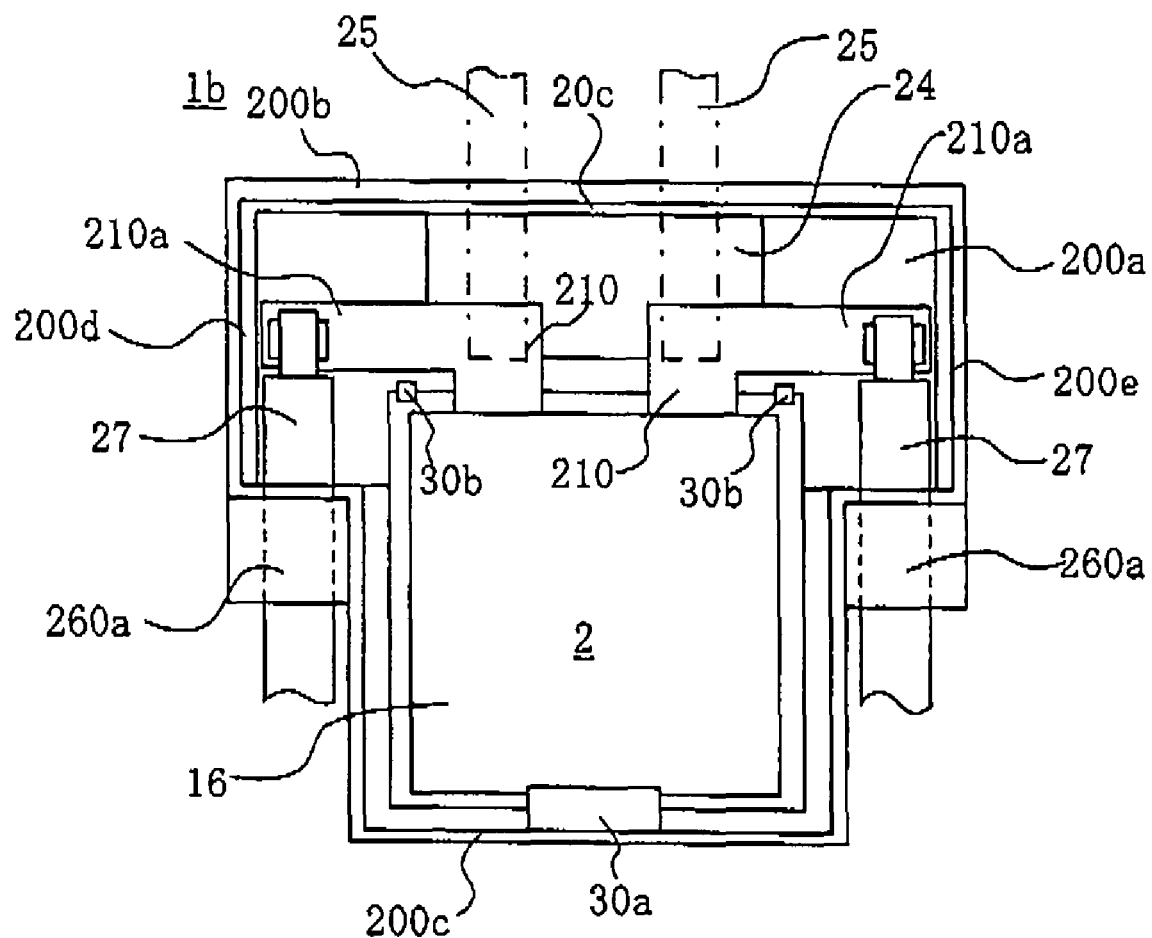
FIG. 7 is a front view of a connector according to a third embodiment of the present invention.

FIG. 7 shows a connector 1b according to a third embodiment of the invention. According to this embodiment, a module box 200 has a bottom wall 200a similar to those of the above-described two embodiments, and also side walls 200b, 200c, 200d and 200e around the bottom plate 200a. The side walls 200d and 200e turn to extend toward the diode module 2 from intermediate points thereof and then contact opposite sides of the diode module 2. Accordingly, the position defining claws 30c are not provided. The diode module 2 is also in contact with the side wall 200c. The diode module 2 has substantially the same configuration as that of the first embodiment, except that terminals 210 equivalent to the terminals 10 turn to extend toward the side walls 200d and 200e, respectively, and the solar cell input/output cables 27 are connected to the extensions 210a. Because of such structure, components equivalent to the terminals 12 are not used. Solar cell input/output cable insertion holes 260a are formed outside the portions of the side walls 200d and 200e which extend toward the diode module 2. The module box 200a is filled with an insulating filler (not shown) so that the terminals 210, the solar cell module leads 25 and the solar cell input/output cables 27 can be embedded in the insulating filler.

Since the remaining portions of the connector 1b are the same as the first embodiment, the same reference numerals as used for the first embodiment are attached to them, and no further description about them is given.

According to the first embodiment, the openings 22, 24 and 28 are formed in the bottom wall 20a of the module box 20, but the openings 22, 24 and 28 may be omitted if the bottom wall 20a is formed to have such a thickness that the heat from the heat dissipating plates 4a and 4b can be conducted through the bottom wall 20a to the solar cell module. The same can be said for the other embodiments. The connector according to the second embodiment may be modified to the form of the connector according to the third embodiment.

The invention claimed is:

1. A solar cell module connector comprising:
   a diode module including a built-in diode chip, said diode module being arranged to connect said diode chip to a solar cell module and being capable of deriving current from said solar cell module; and
   a module box made of insulating material for housing said diode module therein, said module box being provided with a lead lead-in section for leading therein a first lead for connecting said diode chip to said solar cell module and a second lead for deriving current from said diode chip;
   said module box having a wall with a surface adapted to contact said solar cell module, said wall having an opening therein, said diode module being fitted into said opening with a surface thereof exposed through said opening to said solar cell module.

2. The solar cell module connector according to claim 1, wherein:
   said surface exposed through said opening is formed flat and smooth.

3. The solar cell module connector according to claim 2, wherein:
   the surface adapted to contact said solar cell module and the surface exposed through said opening are coplanar with each other.

4. The solar cell module connector according to claim 1, wherein:
   the surface adapted to contact said solar cell module and the surface exposed through said opening are coplanar with each other.

5. The solar cell module connector according to claim 1, wherein:
   said module box has a cover, and said cover has a portion in surface contact with said diode module.

* * * * *